United States Patent Office 2,823,091
Patented Feb. 11, 1958

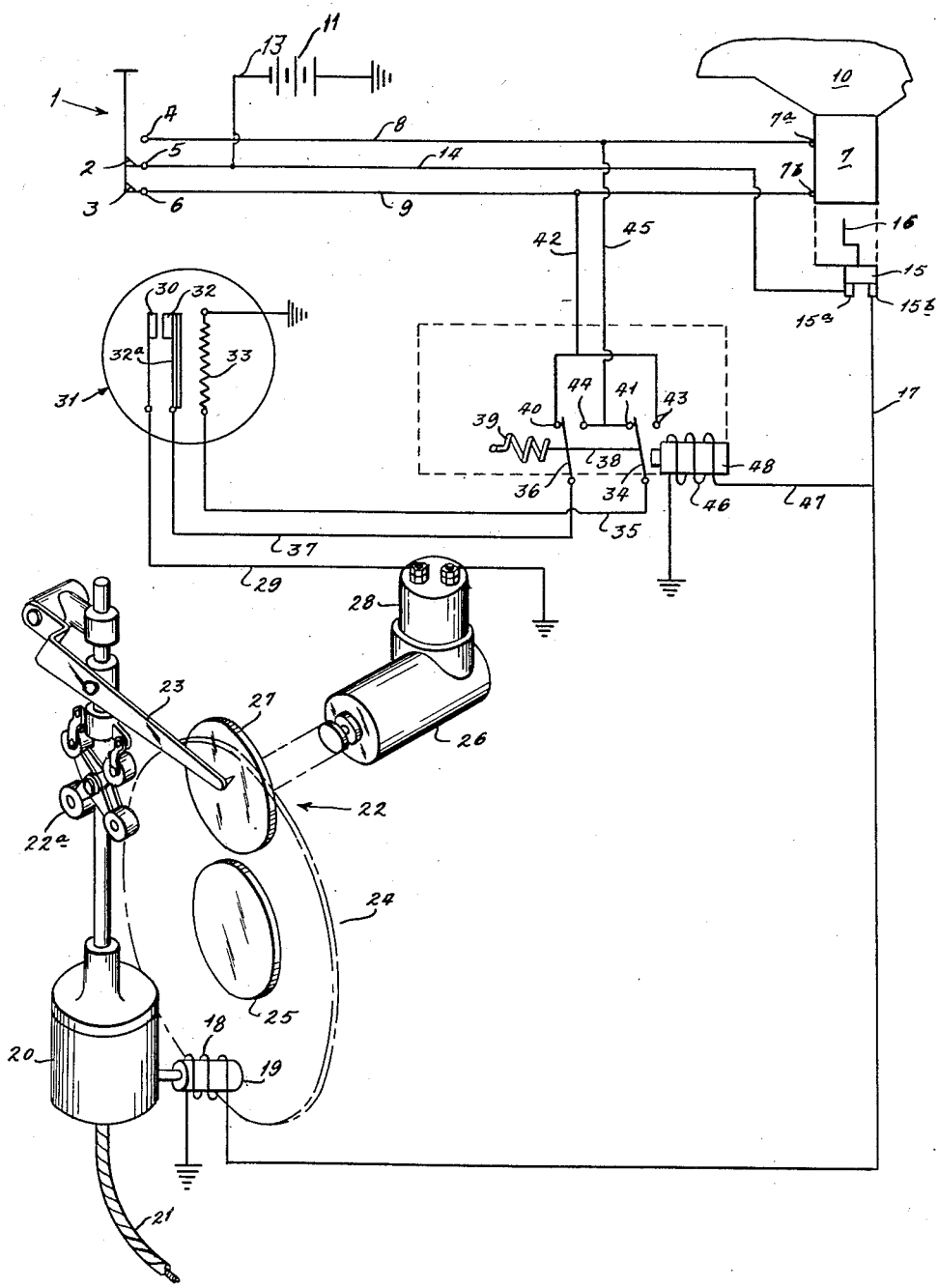

2,823,091

CONTROLLED INTERRUPTOR FOR VARIABLE-SPEED TACHOMETER

Arthur N. Milster, Richmond Heights, Mo., assignor to Wagner Electric Corporation, St. Louis County, Mo., a corporation of Delaware Application December 13, 1954, Serial No. 474,875

9 Claims. (Cl. 346—18)

This invention relates generally to recording tachometers, and more particularly to a variable-speed tachometer for use with vehicles and the like in which a gear ratio can be changed, and which includes control means for interrupting the continuous record of the recording tachometer during the interval while the gear ratios of the vehicle and the tachometer are changed and until the shock of these changes has been attenuated by the vehicle.

In the past, undesirable variations have appeared on the record chart of a continuously recording tachometer when the vehicle on which the tachometer was installed was shifted from one axle ratio to another. One of these undesirable variations is caused by the tachometer recording the engine speed rather than the road speed when the rear axle gearing is disengaged during a change of rear-axle gears. The other major cause of undesirable variation is due to the mechanical time lag between the time the rear-axle gears change and the time when the shift of the ratio changer occurs in the tachometer.

Therefore, a general object of this invention is to provide means for producing a reading on a tachometer record chart that is indicative of the true vehicle operation.

Another object is to eliminate undesirable false readings caused by changes in the gearing during ratio changing operations from appearing on the record chart of a recording tachometer. More particularly, it is an object to provide automatically operable means for causing the recording action of the tachometer to become inoperative when shifting from one gear ratio to another. Specifically, it is an object to provide an automatically operable means which will function to cause the recording action of a recording tachometer to become inoperative upon the actual shifting from one gear ratio to another and to remain inoperative until shortly after the additional shifting of the tachometer gear ratio has been completed.

Yet another object of the present invention is to provide a controlled interruptor for a recording tachometer that does not require the operator of the vehicle to develop new driving habits.

Briefly, the present invention comprises electrical motor means controlled by a time delay relay responsive to the shifting of gear ratios for automatically separating the marking device and the record chart of a recording tachometer, and for maintaining them separated during the interval when the gear ratios are being changed.

The accompanying drawing is a schematic wiring diagram of a device embodying the teachings of the present invention, the chart, marking device, and marking device drive means being shown in perspective.

Referring to the drawing more particularly by reference numerals, the number 1 indicates a "bridging" type pre-selector switch which is manually movable between a "high" position and a "low" position, and which is provided with movable contacts 2 and 3, and cooperating stationary terminals 4, 5 and 6. Moving the pre-selector switch 1 between its positions alternately engages the contact 2 with the cooperating terminals 4 and 5, and the contact 3 alternately engages the cooperating terminals 5 and 6.

The terminals 4 and 6 are connected to leads 8 and 9, respectively. The other end of the lead 8 is connected to a terminal 7a on a rear-axle gear-shifting motor 7, and the other end of the lead 9 is connected to a terminal 7b on the rear-axle gear-shifting motor 7.

The rear-axle gear-shifting motor 7 mechanically tensions a gear shifting spring (not shown) in preparation to shift the rear axle gearing 10 between a "high" and a "low" ratio dependent on the position of the pre-selector switch 1.

A battery 11, which has one side grounded, is connected by a lead 13 to a lead 14 which in turn is connected between the terminal 5 on the pre-selector switch 1 and a terminal 15a located on an "on-off" switch 15. The "on-off" switch 15 is open when the rear-axle gearing 10 is in "high" gear ratio with the preselector switch 1 positioned with the contacts 2 and 3 engaging the cooperating terminals 5 and 6, respectively; and the "on-off" switch 15 is closed or shorted with the pre-selector switch 1 positioned in "low" gear ratio with contacts 2 and 3 engaging the terminals 4 and 5, respectively. The "on-off" switch 15 is operable between the open and the closed conditions responsive to changes in the rear-axle gearing 10. An actuating linkage 16 connected between the gear shifting motor 7 and the "on-off" switch 15 actuates the "on-off" switch 15 between the open and the closed condition when a change is taking place in the rear-axle gearing 10.

A terminal 15b located on the "on-off" switch 15 is connected by a lead 17 to one end of a ratio-changer coil 18, and the other end of the ratio-changer coil 18 is connected to ground. The ratio-changer coil 18 is positioned on a ratio-changer solenoid 19 which is movable between an energized condition and a de-energized condition depending on the condition of the "on-off" switch 15.

The ratio-changer solenoid 19 is operably connected to a ratio-changer 20 which is movable between a "high" gear ratio and a "low" gear ratio depending on the position of the ratio-changer solenoid 19.

A flexible drive shaft 21 driven from a transmission (not shown) is connected to the ratio changer 20. The ratio changer 20 is also linked mechanically with a speed-sensitive portion 22a of a recording tachometer assembly 22. The speed-sensitive portion 22a governs the movement of a marking device 23 connected thereto, relative to a record chart 24. The record chart 24 is shown positioned on a back-up plate 25, which is moved at a constant speed by a timed drive means (not shown).

An over-ride solenoid 26 operable between an energized position and a de-energized position carries a pressure plate 27 that abuts one side of the record chart 24 when the over-ride solenoid 26 is in the de-energized position. The abutment of the pressure plate 27 with the record chart 24 urges the latter into cooperative engagement with the marking device 23.

A coil 28 is carried by the over-ride solenoid 26. One side of the coil 28 is grounded and the other side is connected to a lead 29 which is connected to a stationary contact 30 on a time delay relay 31. The time delay relay 31 includes the stationary contact 30, a movable contact 32 fastened to a bi-metallic strip 32a, and a heating element 33. The bi-metallic strip 32a is movably sensitive to heat and positioned in the time delay relay 31 in close relation to the heating element 33 so that when warmed by the heating element 33 the bi-metallic strip 32a will bend and move the contact 32 into engagement with the contact 30.

The heating element 33 is grounded at one end and the other end is connected to an operable switch-blade 34 by a lead 35. The bi-metallic strip 32a in the time delay relay 31 is connected to an operable switch-blade 36 by a lead 37. The operable switch-blade 34 is ganged with the operable switch-blade 36 by an intermediate link 38 so that the switch-blades 34 and 36 will move in unison. A spring 39 is connected to the ganged switch-blades 34 and 36 and normally biases the switch-blades 34 and 36 to the left, or toward a de-energized condition. A stationary terminal 40 and a stationary terminal 41 are positioned to engage the switch-blades 34 and 36, respectively, when the latter are in the de-energized position. A lead 42 connects the lead 9 with the terminal 40. A stationary terminal 43 positioned to cooperate with switch blade 34 when the latter is in the energized position is also connected to the lead 42, making the terminal 40 common electrically with the terminal 43. A terminal 44 is positioned to engage the switch-blade 36, when the latter is moved to the energized position, and is connected in common with the terminal 41, to a lead 45. The lead 45 is connected between the lead 8 and the terminals 41 and 44. A coil 46 is connected between ground and a lead 47 to provide energy for operating a switch-blade solenoid 48. The outer end of the lead 47 is connected to the lead 17. The solenoid 48, when energized by the coil 46, is movable between an operative position in which the switch-blades 34 and 36 engage the terminals 43 and 44, respectively, and a non-operative position in which the switch-blades 34 and 36 engage the terminals 40 and 41, respectively.

*Operation*

With the component parts positioned as illustrated in the drawing, it will be assumed that the vehicle is operating in the "high" rear-axle gear-ratio. When the operator elects to shift to the "low" rear-axle gear-ratio, the pre-selector switch 1 is manually repositioned to cooperatively engage the contacts 2 and 3 with the terminals 4 and 5 respectively. Because the battery 11 is connected to the lead 14, the repositioning of the pre-selector switch 1 allows current flow through the lead 8 to energize the "low" winding of the vehicle gear shifting motor 7. A gear shifting spring (not shown) is tensioned by the energized gear shifting motor 7 in preparation to shifting the rear-axle gearing 10 from the "high" to the "low" ratio and also in preparation to simultaneously actuate the linkage 16 to close the "on-off" switch 15.

When the pre-selector switch 1 is transferred from high position to the low position, the terminals 41 and 44 are energized simultaneously with the "low" ratio winding of the shifting motor 7. Because the switch-blade 34 is cooperatively engaged with the terminal 41 due to the biasing action of the spring 39, the current flows from said terminal 41 through the switch blade 34 and via lead 35 energizes the heating element 33 in the time delay relay 31. The heat emitted from the energized heating element 33 causes the bimetallic strip 32a to bend and engage the normally open contacts 30 and 32. The terminals 40 and 43 are de-energized at this time, and there will be no current flow therethrough to energize the over-ride solenoid 26 until the shifting of the rear-axle gears 10 actually occurs.

To shift rear-axle gear-ratios, the operator normally removes the torque from the rear-axle gearing by releasing the accelerator (not shown). Once this torque is removed, the gear shifting spring which has been tensioned by the shifting motor 7, as aforementioned, disengages the "high" ratio of the rear-axle gearing 10 and simultaneously actuates the linkage 16 to close the "on-off" switch 15. When closed, the switch 15 allows current to flow from the energized lead 14 to the lead 17 and the branching lead 47 to simultaneously energize the coil 18 of the ratio-changer solenoid 19 and the coil 46 of the switch-blade solenoid 48. Therefore, the ratio changer solenoid 19 shifts the ratio changer 20 into its "low" ratio as the "high" ratio of the rear-axle gearing 10 is disengaged. In this manner, the "low" ratio of the ratio changer 20 complements the "low" ratio of the rear-axle gearing 10 and presents a true indication of the vehicle operation to the marking device after the shock incident with the change has attenuated.

During the interim of disengagement of this rear-axle gearing 10, the changing speed of the engine of the vehicle normally causes undesired variations to be transmitted by the flexible shaft 21 to the marking device 23 through the speed sensitive portion (22a) of the recording tachometer assembly 22. To prevent these variations from being recorded on the cooperating recording chart 24, the switch-blade solenoid 48 is energized as the "high" ratio of the rear axle gearing 10 is disengaged, as aforementioned; therefore, said solenoid 48 cooperatively engages the switch-blades 34 and 36 with the cooperating stationary terminals 43 and 44 respectively. By this transfer of switch-blades 34 and 36, the heating coil 33 is de-energized because the lead 35 connected between the heating element 33 and the switch-blade 34 is now connected to the de-energized terminal 43. Simultaneously, the over-ride solenoid 26 in the tachometer assembly 22 is energized. The current flows to the coil 28 of the over-ride solenoid 26 from the battery 11 via the energized terminal 44, the energized switch-blade 36 and the lead 37, through the bi-metallic strip 32a and the cooperatively engaged contacts 32 and 30, and therefrom into the lead 29 and the coil 28 of said over-ride solenoid 26. When energized, the over-ride solenoid 26 moves the pressure plate 27 thereby separating the record chart 24 from the marking device 23. Because the energization of the over-ride solenoid 26 is substantially simultaneous with the energization of the switch-blade solenoid 48, engagement between the recording chart 24 and the marking device 23 is interrupted as the disengagement of the "high" ratio of the rear-axle gearing 10 occurs.

Because time lag is inherent to mechanical drives and flexible shafts, undesirable variations initiated during the disengagement interim, as aforementioned, are transmitted by said flexible shaft 21 to the marking device 23 of the tachometer assembly 22 only after the cooperation between said marking device 23 and the record chart 24 has been interrupted.

As previously described, when the "high" ratio in the rear axle gearing 10 is disengaged, the heating element 33 in the time delay relay 31 is deenergized. Therefore, the bi-metallic strip 32a cools and the contacts 30 and 32 open soon after the "low" ratio of the rear-axle gearing 10 is engaged. This allows the tachometer assembly 22 and the marking device 23 to be driven in the new "low" ratio before the contacts 30 and 32 open to de-energize the over-ride solenoid 26. Upon de-energization of the over-ride solenoid 26, the pressure plate 27 abuttingly re-engages the recording chart 24 which in turn is cooperatively re-engaged with the marking device 23 to resume recording of the vehicle operation.

The operator can also shift from the "low" to the "high" ratio by resetting the pre-selector switch 1 and releasing the accelerator in the same manner as previously described. It should be noted that during the time when the vehicle is in "low" rear-axle gear-ratio the "on-off" switch 15 remains closed and holds the switch-blade solenoid 48 and the ratio changer solenoid 19 energized. When operating the pre-selector switch 1 by moving it into "high," a circuit is closed through lead 9, terminal 43, switch blade 34, to the heating element 33. The bi-metallic strip 32a will then close the cooperating contacts 30 and 32 which provide the circuit to the coil 28 of the over-ride solenoid 26 as soon as the accelerator is released. Releasing the accelerator takes the torque off of the rear-axle gears 10 as previously described and enables the shifting motor 7 to move into "high." This movement of motor 7 opens the "on-off" switch 15 and de-energizes the switch-blade solenoid 48 and the ratio-changer solenoid 19. Because the switch-blade solenoid 48 is de-energized the switch-blades 34 and 36 return to normal by the action of the return spring 39. In normal position switch-blade 36 provides a path from lead 9, which is now energized, through the contact points 30 and 32 to energize the over-ride solenoid 26 and thereby interrupt the continuous record being made in a manner similar to that described when shifting from "high" to "low."

Thus it is apparent that there has been provided a novel control interruptor for variable-speed tachometers which fulfills all of the objects and advantages sought therefor.

It is to be understood that the foregoing description and the accompanying drawing have been given only by way of illustration and example, and that changes and alterations in the present disclosure, which will be readily apparent to one skilled in the art are contemplated as within the scope of the present invention which is limited only by the claims which follow.

What I claim is:

1. In combination, a manually operable pre-selector switch movable between a first position and a second position; a gear ratio changer movable between a low position and a high position dependent on the position of said pre-selector switch, responsive to a change in external physical conditions; a recording tachometer assembly including a marking device and means for supporting a chart adjacent the marking device, said marking device and chart supporting means being movable between an operative position and an inoperative position, said tachometer assembly also including speed ratio changing means movable between a high position and a low position responsive to the movement of the gear ratio changer; and control means for moving the marking device and the chart supporting means to the inoperative position upon movement of the gear ratio changer between the low position and the high position.

2. In combination, a manually operable pre-selector switch movable between a first position and a second position; a gear ratio changer movable between a low position and a high position dependent on the position of said pre-selector switch, responsive to a change in external physical conditions; a recording tachometer assembly including a marking device and means for supporting a chart adjacent the marking device, said marking device and chart supporting means being movable between an operative position and an inoperative position, said tachometer assembly also including speed ratio changing means movable between a high position and a low position responsive to the movement of the gear ratio changer; and control means for moving the marking device and the chart supporting means to the inoperative position upon movement of the gear ratio changer between the low position and the high position; said control means containing time delay means for maintaining the marking device and the chart supporting means in the inoperative position until after the tachometer speed ratio changing means has fully changed position.

3. In combination, a manually operable pre-selector switch movable between a first position and a second position; a rear ratio changer movable between a low position and a high position dependent on the position of said pre-selector switch, responsive to a change in external physical conditions; a recording tachometer assembly including a marking device and means for supporting a chart adjacent the marking device, said marking device and chart supporting means being movable between an operative position in which the marking device and the chart are in contact, and an inoperative position in which they are out of contact; yieldable means normally urging the marking device and chart supporting means toward the operative position; the tachometer also including speed ratio changing means movable between a high position and a low position responsive to the movement of the gear ratio changer; and control means for moving the marking device and the chart supporting means from the operative position to the inoperative position upon movement of the gear ratio changer between the low position and the high position, said control means containing time delay means for maintaining the marking device and the chart means in the inoperative position until after the tachometer speed ratio changing means has fully changed position.

4. In combination, a manually operable pre-selector switch movable between a first position and a second position; a gear ratio changer movable between a low position and a high position dependent on the position of said pre-selector switch, responsive to a change in external physical conditions; a recording tachometer including a marking device and means for supporting a chart adjacent the marking device, said chart supporting means being movable relative to the marking device between an operative position in which the chart is in contact with the marking device and an inoperative position in which the chart is spaced from the marking device; yieldable means urging the chart supporting means toward the operative position; the tachometer also including speed ratio changing means movable between a high position and a low position responsive to the movement of the gear ratio changer; electrical motor means for moving the chart supporting means to the inoperative position; and automatic control means for energizing the motor means responsive to the movement of the gear ratio changer between the low position and the high position and for maintaining the motor means energized until the movement of the tachometer speed ratio changing means has completed its movement between the high position and the low position.

5. In combination, a manually operable pre-selector switch movable between a first position and a second position; a gear ratio changer movable between a low position and a high position dependent on the position of said pre-selector switch and responsive to a predetermined change in external physical conditions; a recording tachometer, including a timed drive means, a chart for making a record thereon movably operated by the timed drive means and yieldably biased into operable engagement with a marking device; speed-sensitive drive means operably connected between the marking device and the rear-axle gearing for moving the marking device on the chart responsive to axle speed, a tachometer ratio changer interposed between the speed sensitive drive means and the rear-axle gearing for changing the gear ratio to the speed sensitive drive means responsive to changes in the rear-axle gear changer; motor driven disengaging means for separating the marking device from the movable chart; and control means for operating the disengaging means during the intervals when the gear ratio changer is moving between the high position and the low position and the complementary ratio change is taking place in the speed-sensitive drive means of the tachometer assembly responsive to the change in the gear ratio changer.

6. A controlled interruptor device for a recording tachometer, comprising manually operable pre-selector means movable between a high position and a low position for selecting a desired rear-axle gear-ratio; rear-axle gear-ratio changing means operable between at least two rear-axle gear-ratios dependent on the position of the pre-selector means and responsive to pre-determined external physical conditions; a recording tachometer assembly including a tachometer ratio changer responsive to changes in the rear-axle ratio-changing means for coordinating the tachometer gear-ratio with the rear-axle gear-ratio, a speed-sensitive marking device, means for supporting a record chart in operable engagement with said marking device, said record chart being driven by a timed drive means, and disengaging means for separating the marking device from the record chart operable by control means and responsive to changes in the pre-selector means and the rear-axle gear-ratio changing means.

7. A controlled interruptor device for a recording tachometer, comprising a manually operable pre-selector means for selecting a desired rear-axle gear-ratio; a rear-axle gear-ratio changer operable between at least two gear ratios dependent on the position of the pre-selector means, and responsive to external pre-determined physical conditions; a recording tachometer assembly including a speed-sensitive marking device, a ratio changer interposed between the marking device and the rear-axle gearing to coordinate the gear ratio of the speed sensitive marking device with the gear ratio of the rear-axle gearing responsive to changes in the rear-axle gear-ratio changer, a record chart yieldably biased into cooperative engagement with the speed-sensitive marking device, and disengaging motor means operable between a de-energized position in which the record chart is engaged with the marking device and an energized position in which the record chart is separated from the marking device, and control means responsive to the movement of the pre-selector means and the movement of the rear-axle ratio-changer means for energizing the disengaging motor means and separating the marking device from the record chart during intervals when changing rear-axle gear-ratios.

8. A controlled interrupting device for a recording tachometer for interrupting the record during and immediately following a change in rear-axle gear-ratios, comprising a manually operable pre-selector means for selecting a desired rear-axle gear-ratio; a rear-axle gear-ratio changer operable between at least two gear ratios dependent on the position of the pre-selector means and responsive to changes in pre-determined external physical conditions; a recording tachometer assembly including a speed-sensitive marking device, a ratio changer interposed between the marking device and the rear-axle gearing responsive to changes in the position of said rear-axle gear-ratio changer for changing ratios to the tachometer speed-sensitive marking device, a record chart yieldably biased into cooperative engagement with the speed sensitive marking device for making a record thereon, and disengaging means operable between a de-energized condition in which the marking device is cooperatively engaged with the record chart and an energized condition in which the record chart is separated from the marking device; and control means including a time delay element responsive to changes in the position of the pre-selector means and to the movement of the rear-axle ratio changer means for regulating the energizing of the disengaging means and maintaining said energized condition until the change in rear-axle gear-ratios and the change in the tachometer gear ratios have been completed.

9. A controlled interruptor device for a recording tachometer for eliminating the recording of undesirable variations that occur during gear shifting operations; comprising a pre-selector switch movable between a first position and a second position; a rear-axle gear-ratio changer movable between multiple rear-axle gear-ratios depending on the setting of the pre-selector switch and responsive to changes in pre-determined external physical conditions incident to normal gear changing operations; a recording tachometer including a marking device, speed-sensitive drive means interposed between said marking device and the rear-axle gearing, a ratio-changer responsive to changes in the rear-axle ratio-changer for coordinating the gear-ratio of the speed-sensitive drive means with the rear-axle gear-ratio, a record chart yieldably maintained in operable engagement with the marking device for making a record thereon, and motor operated disengaging means for separating the marking device from the recording chart responsive to control means; said control means responding to changes in the pre-selector means and the corresponding changes in the rear-axle gear-changer.

References Cited in the file of this patent
UNITED STATES PATENTS

| | | |
|---|---|---|
| 1,909,310 | Ohmer et al. | May 16, 1933 |
| 2,668,094 | Chelf | Feb. 2, 1954 |